United States Patent [19]
Fleming, Jr.

[11] Patent Number: 6,041,623
[45] Date of Patent: Mar. 28, 2000

[54] PROCESS FOR FABRICATING ARTICLE COMPRISING REFRACTORY DIELECTRIC BODY

[75] Inventor: James William Fleming, Jr., Westfield, N.J.

[73] Assignee: Lucent Technologies Inc., Murray Hill, N.J.

[21] Appl. No.: 09/141,440

[22] Filed: Aug. 27, 1998

[51] Int. Cl.[7] .................................................. C03B 29/00
[52] U.S. Cl. ............................. 65/391; 65/17.2; 65/61; 65/104; 65/120; 65/436
[58] Field of Search .......................... 65/17.2, 61, 104, 65/120, 391, 436; 219/121.36; 216/67

[56] References Cited

U.S. PATENT DOCUMENTS

| | | | |
|---|---|---|---|
| 3,811,857 | 5/1974 | Deeg et al. | 65/65 |
| 3,870,497 | 3/1975 | Spiessens . | |
| 4,125,389 | 11/1978 | King . | |
| 4,217,027 | 8/1980 | MacChesney et al. | 385/123 |
| 4,262,035 | 4/1981 | Jaeger et al. | 427/571 |
| 4,746,345 | 5/1988 | Pluijms et al. | 65/391 |
| 4,761,170 | 8/1988 | Mansfield | 65/391 |
| 4,775,401 | 10/1988 | Fleming et al. | 65/395 |
| 4,854,956 | 8/1989 | Pluijms et al. | 65/391 |
| 4,863,501 | 9/1989 | Mansfield | 65/391 |
| 4,909,816 | 3/1990 | MacChesney et al. | 65/420 |
| 4,983,255 | 1/1991 | Gruenwald et al. | 134/1.1 |
| 5,000,771 | 3/1991 | Fleming et al. | 65/2 |
| 5,106,402 | 4/1992 | Geittner et al. | 65/391 |
| 5,194,714 | 3/1993 | LeSergent | 219/121.36 |
| 5,221,306 | 6/1993 | Fleming, Jr. et al. | 65/391 |
| 5,240,488 | 8/1993 | Chandross et al. | 65/395 |
| 5,397,372 | 3/1995 | Partus et al. | 65/391 |
| 5,692,087 | 11/1997 | Partus et al. | 385/123 |

FOREIGN PATENT DOCUMENTS

| | | |
|---|---|---|
| 166846 | 7/1985 | European Pat. Off. . |
| 0216338 | 4/1987 | European Pat. Off. . |
| 325227 | 1/1989 | European Pat. Off. . |
| 2589461 | 5/1987 | France . |
| 0727392 | 8/1996 | France . |
| 62-21724 | 6/1987 | Japan . |
| 90/02103 | 3/1990 | WIPO . |

OTHER PUBLICATIONS

F. DiMarcello et al. "Fiber Drawing and Strength Properties," *Optical Fiber Communications*, vol. 1, Academic Press, Inc., pp. 179–248 (1995).

*Primary Examiner*—Sean Vincent
*Attorney, Agent, or Firm*—Scott J. Rittman

[57] ABSTRACT

The smoothness of refractory dielectric bodies, particularly silica sol-gel bodies, is substantially improved by a relatively straightforward treatment. In particular, the surface of the body is treated with a plasma fireball, such as induced by a plasma torch. The treatment is able to reduce the roughness, as measured by RA, in overcladding tubes formed by a sol-gel process by at least a factor of 2, typically at least a factor of 5. It is also possible to improve the smoothness of silica tubes that are drawn from a billet. Typically, the process reduces the roughness of silica bodies to an RA of about 1 microinch or less.

28 Claims, 2 Drawing Sheets

PROCESS FOR FABRICATING ARTICLE COMPRISING REFRACTORY DIELECTRIC BODY

BACKGROUND OF THE INVENTION

1. Field of the Invention

The invention relates to refractory dielectric bodies, in particular glass optical fiber preforms.

2. Discussion of the Related Art

Optical fiber is produced from a glass preform. As discussed in F. DiMarcello et al. "Fiber Drawing and Strength Properties," *Optical Fiber Communications,* Vol. 1, Academic Press, Inc., 1995, at 179–248, the disclosure of which is hereby incorporated by reference, the preform is generally arranged vertically in a draw tower such that a portion of the preform is lowered into a furnace region. The portion of the preform placed into the furnace region begins to soften, and the lower end of the preform forms what is known as the neck-down region, where glass flows from the original cross-sectional area of the preform to the desired cross-sectional area of the fiber. From the lower tip of this neck-down region, the optical fiber is drawn.

The optical fiber typically contains a high-purity silica glass core optionally doped with a refractive index-raising element such as germanium, an inner cladding of high-purity silica glass optionally doped with a refractive index-lowering element such as fluorine, and an outer cladding of undoped silica glass. In some manufacturing processes, the preforms for making such fiber are fabricated by forming an overcladding tube for the outer cladding, and separately forming a rod containing the core material and inner cladding material. Overcladding tubes are capable of being formed by a sol-gel process, as discussed, for example, in U.S. Pat. No. 5,240,488, the disclosure of which is hereby incorporated by reference. It is also possible to form overcladding tubes by drawing the tubes from a silica billet, and such tubes are available commercially. The core/inner cladding rods are fabricated by any of a variety of vapor deposition methods known to those skilled in the art, including vapor axial deposition (VAD), outside vapor deposition (OVD), and modified chemical vapor deposition (MCVD). MCVD is discussed in U.S. Pat. Nos. 4,217,027; 4,262,035; and 4,909,816, the disclosures of which are hereby incorporated by reference. MCVD involves passing a high-purity gas, e.g., a mixture of gases containing silicon and germanium, through the interior of a silica tube (known as the substrate tube) while heating the outside of the tube with a traversing oxy-hydrogen torch. In the heated area of the tube, a gas phase reaction occurs that deposits particles on the tube wall. This deposit, which forms ahead of the torch, is sintered as the torch passes over it. The process is repeated in successive passes until the requisite quantity of silica and/or germanium-doped silica is deposited. Once deposition is complete, the body is heated to collapse the substrate tube and obtain a consolidated rod in which the substrate tube constitutes the outer portion of the inner cladding material. To obtain a finished preform, the overcladding tube is typically placed over the core rod, and the components are heated and collapsed into a solid, consolidated preform, as discussed in U.S. Pat. No. 4,775,401, the disclosure of which is hereby incorporated by reference. Prior to collapsing the tube onto the rod, it is sometimes desirable to treat the outer surface of the rod and/or the inner surface of the overcladding tube, e.g., by cleaning with solvents, fire polishing, and or etching. Some of these treatments, however, are harsher than desired in that they require removal of some surface material and/or involve mechanical stress or chemical attack.

While current methods for treating preform components and forming preforms are adequate, improvements and/or alternatives are desired.

SUMMARY OF THE INVENTION

It has been found to be possible to substantially improve the smoothness of refractory dielectric bodies, particularly silica sol-gel bodies, by a relatively straightforward treatment. In particular, a surface of the body is treated with a plasma fireball, such as induced by a plasma torch, at conditions that increase the smoothness of the body's surface but do not result in substantial removal of the surface of the body. (Substantial removal of the surface of the body indicates removal of more than about 0.1 mm from at least 90% of the surface of the body, the amount removed measured subsequent to completion of the plasma treatment. The removal of more than 0.1 mm at the end regions of a body, for example, is typical, due to the effect of a traversing fireball, as discussed in more detail below. Refractory indicates a ceramic material of relatively low thermal conductivity that is capable of withstanding temperatures of up to about 1600° C. without essential change. Dielectric indicates an electrically insulating material, i.e., a material having a resistivity of about $10^6$ ohm-cm or greater.)

The treatment is able to reduce the roughness, as measured by RA, in silica overcladding tubes formed by a sol-gel process by at least a factor of 2, typically at least a factor of 5, advantageously at least a factor of 10. It is also possible to reduce the roughness of silica tubes that are drawn from a billet, generally by at least a factor of 2. Typically, the process reduces the roughness of silica bodies to an RA of about 1 microinch or less, advantageously 0.5 microinches or less. (RA is a well-known roughness parameter reflecting the arithmetic average of roughness irregularities as measured from the surface profile to a center line, over a particular sampling length. RA measurements are explained, for example, in the following standards: DIN 4768, ISO 4287, ANSI B46.1, the disclosures of which are hereby incorporated by reference. As used herein, RA refers to the mean RA of a set of at least 12 samplings, each sampling performed over a length of at least 0.2 inches.)

The invention thereby provides a straightforward process for improving the smoothness of bodies such as those used in optical fiber preforms, such smoothness providing better fit between such components upon formation of the preform.

DETAILED DESCRIPTION OF THE INVENTION

Figure 1A:
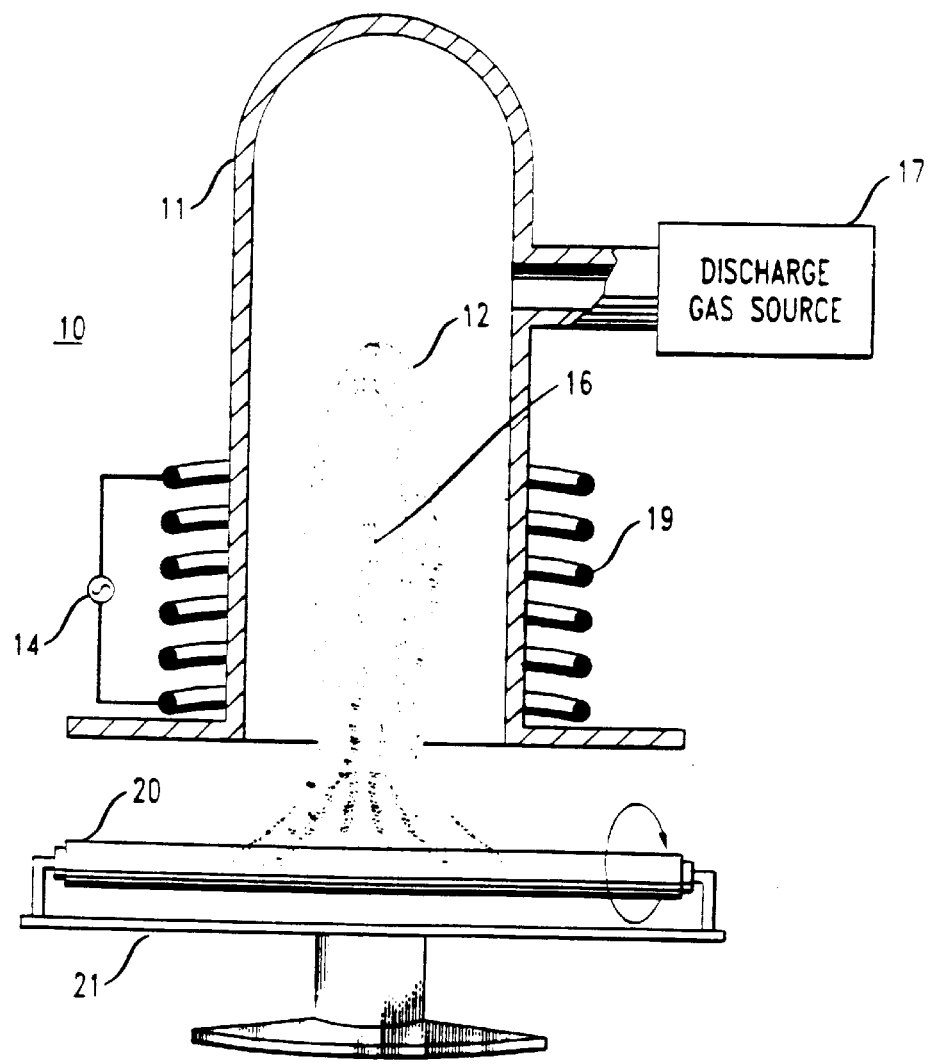
FIG. 1A shows an isothermal plasma torch useful for an embodiment of the process of the invention.

According to the invention, a refractory dielectric body, e.g., a silica glass overcladding tube, a silica core rod, a silica glass optical fiber preform, or a planar waveguide, is heated by use of a plasma fireball to improve the smoothness of the body. It is possible to use the process of the invention for refractory dielectric bodies of various shapes, both solid and hollow. For example, the process is useful for improving the smoothness of the interior surface of silica overcladding tubes for optical fiber preforms, particularly tubes formed by a sol-gel process. In fact, the treatment is able to reduce the roughness of such overcladding tubes, as measured by RA, by at least a factor of 2, typically at least a factor of 5, advantageously at least a factor of 10. It is also possible to reduce the roughness of silica tubes that are drawn from a billet, generally by at least a factor of 2. The process generally reduces the roughness of silica bodies to an RA of about 1 microinch or less, advantageously 0.5 microinches or less. While the mechanism for smoothing appears to be complex, it is believed that, at least for interior surfaces of a hollow body, surface material is removed due to the heat generated by the plasma fireball and is then re-deposited on the interior surface ahead of the fireball, where at least a portion of the re-deposited material is melted and cooled as the fireball passes by. This combination of removal, re-deposition, and melting appears to provide the increase in smoothness, although it is believed to be possible to obtain the smoothing with only a small extent of material removal and re-deposition.

Optionally, the process is performed in the absence of simultaneous deposition of material onto the dielectric body, e.g., in the absence of deposition of cladding material onto a fiber core rod or of deposition of fiber core material into a substrate tube. Moreover, the improved smoothness is attained without substantial removal of the surface of the body, advantageously with less than 0.05 mm of the surface being removed over at least 90% of the body, more advantageously with no surface being removed over at least 90% of the body. (The end regions of, for example, tubes treated according to the invention will generally exhibit removal of more than 0.1 mm of surface, due to the inability for re-deposition at these end points.)

Advantageously, an isothermal plasma torch is used, isothermal indicating that the ion temperature and electron temperature are substantially the same in the plasma. The plasma of an isothermal plasma torch typically contains electrically conducting regions with a center region in which the plasma temperature is the highest. A plasma fireball is defined as the region containing the electrically conducting portion of the plasma, into which the plasma-sustaining electromagnetic energy is coupled. A variety of gases, known to those skilled in the art, are expected to be useful for forming an isothermal plasma. Examples include gases containing at least one of oxygen, argon, nitrogen, helium, with the possibility of adding further gases.

An example of an isothermal plasma torch 10 useful primarily for treating solid bodies or the outside surface of hollow bodies is shown in FIG. 1A. The torch 10 contains a fused silica mantle 11 connected to a gas source 17. The gas source 17 delivers the gas used for the plasma discharge into the mantle 11, and the plasma fireball 12 is excited by a radio frequency (RF) coil 19 and RF generator 14. The fireball 12 is typically contained primarily within the torch, with the center 16 of the fireball 12 typically located approximately at the middle of the RF coil 19. As reflected in FIG. 1A, where the refractory dielectric body 20 is cylindrical, e.g., an optical fiber preform, the body is typically mounted to a lathe 21, which is capable of rotating the body 20 during treatment. The torch 10 is typically mounted such that it is capable of being vertically adjusted and tilted to allow a desired arrangement of the fireball 12 with respect to the body 20. Torch 10 is typically capable of lateral movement in order to traverse the body 20. It is also possible for the lathe 21 to provide such lateral movement. In addition, as discussed in U.S. Pat. No. 5,000,771, it is possible to configure a torch such that the fireball is pushed further outside the mantle.

Figure 1B:
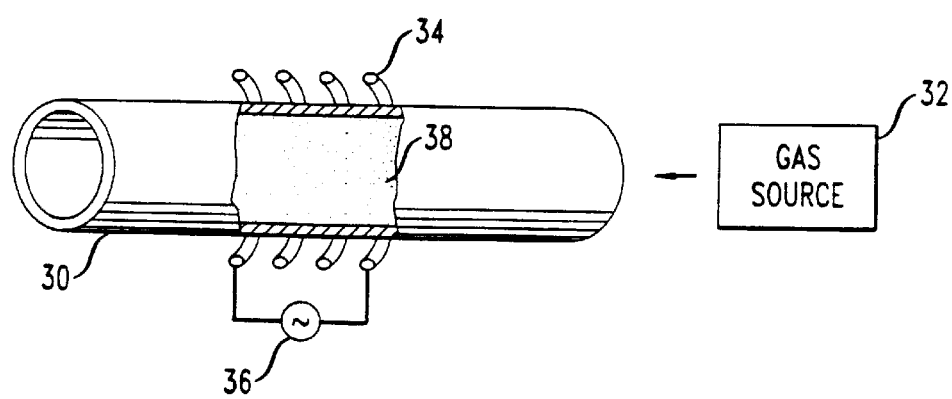
FIG. 1B shows an embodiment of the process of the invention in which the interior of a refractory dielectric tube is treated by a plasma fireball.

To treat the inner surface of a hollow body, e.g., a tube, it is also possible to use a torch of the type shown in FIG. 1A. To do so, a small fireball is generated outside the torch and inserted into the tube. Subsequent to insertion, the fireball is enlarged to contact the inner surfaces of the tube by increasing the gas flow and/or the power, and/or by pushing the fireball further out of the torch (as discussed in U.S. Pat. No. 5,000,771). Advantageously, however, the inside of a hollow body is treated using an apparatus such as shown in FIG. 1B, in which the hollow body itself forms the plasma torch. As shown in FIG. 1B, plasma gas from source 32 is directed into a tube 30, and the plasma fireball is generated inside the tube by RF coils 34 (and an RF generator 36) surrounding the tube. The tube 30 or the group of coils 34, or both, are capable of being moved such that the entire inner surface of the tube 30 is treated. In addition, the tube 30 (or a similar hollow body) is typically rotated during treatment to improve the uniformity of the treatment. (As used herein, plasma torch refers to either a torch separate from the body being treated, as in FIG. 1A, or an apparatus such as FIG. 1B, in which a hollow refractory dielectric body constitutes a portion of the torch.)

A variety of parameters have been found to be useful to attain desired smoothing of a refractory dielectric body. However, because these parameters are interrelated, values outside the ranges below are also possible. Typically, a surface temperature of at least 1700° C. is useful for attaining a desired smoothing. A higher temperature, however, generally leads to a reduced time to the desired smoothing, and vice versa. (Surface temperature is measured, for example, by aiming an infrared pyrometer at the area of the body just exiting the fireball, where the pyrometer is set at a wavelength of about 4 to 5 μm and an emissivity of about 0.9 (useful for outer surfaces), or by using a brightness pyrometer, similarly aimed at the area just exiting the fireball (useful for inner surfaces of a hollow body).) A useful range for plasma torch power (i.e., RF generator power) is about 10 to about 100 kW (depending on the frequency), e.g., about 20 to 60 kW at about 3 MHz. Useful traverse rates for the fireball with respect to the body range from about 1 to about 400 cm/min for an outer surface of a body, and about 5 to about 400 cm/min for an inner surface of a hollow body (with the lower end of this range suitable for tubes of relatively large inner diameter and cross-sectional area). The traverse rate is attained by moving the torch (for a separate torch, as in FIG. 1A), the RF coils (where the body is hollow and constitutes part of the torch, as in FIG. 1B), and/or the body. A useful range for body rotation (for solid, cylindrical bodies) is about 10 to about 100 revolutions per minute (rpm). A useful separation distance between the center of the fireball and the surface of the body (primarily for treatment of an outer surface of a body) is about 3 to about 10 cm. (For treatment of an inner surface of a hollow body, however, rotation and distance between fireball and surface are often irrelevant because the plasma generally fills the interior of the body. For such a case, the traverse rate becomes the primary consideration.) The separation distance will vary depending in part on the overall size of the fireball, which in turn varies based largely on the torch power. Specifically, as the power into the fireball lead is increased, a larger volume of gas is ionized at any given instant, thereby increasing the length and diameter of the fireball. Gas flow into the plasma torch is typically about 1 to about 100 liters/min. A control sample is easily used to determine the precise parameters for a particular body that will yield a desired result.

In addition, when treating the inner surfaces of a tube, plasma formation is typically eased by preheating the area of the tube in which the plasma will initially be formed and by providing extra power, e.g., about 2 to about 6 kW above the level used to maintain the fireball. For example, for a silica tube have an inner diameter of 15–25 mm and an outer diameter of 50–60 mm, a preheat temperature of about 600° C. and an initial power of about 30 kW are typical. Once the plasma fireball is formed, the heating mechanism is generally no longer required, and the power level is typically able to be lowered. However, depending on the particular equipment and the particular body being treated, it is possible for an increase in power subsequent to fireball formation to be useful in attaining desired smoothing. When treating an inner surface of a tube, the thickness of the tube should be considered, since thickness has an effect on the field required to initiate and maintain a plasma fireball. Specifically, the thicker the tube walls, the higher the power needed. Also, tubes having larger inner diameters offer easier formation and maintenance of a plasma fireball, because larger inner diameters tend to approach the equilibrium conditions of the fireball, i.e., the size, shape, etc. that the fireball would exhibit without the hindrance of the tube walls.

The process is useful for treating a variety of refractory dielectric bodies, including optical fiber preforms, core rods for such preforms, and the inner and/or outer surfaces of overcladding tubes for such preforms. For example, it is possible to treat the inside of an overcladding tube and the outside of a separate core rod prior to collapsing the tube onto the rod to form the final preform. The improved smoothness leads to better fit between components, thereby improving the structural quality of the overall preform.

The invention will be further clarified by the following examples, which are intended to be purely exemplary.

EXAMPLE 1

A silica tube formed by a sol-gel process, such as described in U.S. Pat. No. 5,240,488, was obtained, the tube having a length of 1 meter, an inner diameter of 19 mm and an outer diameter of 50 mm. The roughness, RA, of the bore was measured by sampling a 0.2 inch length at 16 different positions, with a Precision Device Surfometer. The result is shown as sample A in FIG. 2. (The point indicates the mean; the midline indicates the median; the box indicates 25% to 75% of the data; and the outer bars show the range of 100% of the data.)

The sample tube was fused to another silica tube of similar dimensions, which acted as a handle. The assembly was mounted in a chuck of a conventional glass-working lathe, and a gas injection fitting was placed into the handle. The chuck was capable of being rotated at up to 200 rpm. A three-turn RF coil having an inner diameter of about 60 mm was positioned around the sample tube, and the coil was attached to an apparatus that enabled controlled movement over the full length of the sample tube. Argon gas was delivered to the tube bore through the gas injector at a flow rate of 2 liters/minute. At the end of the sample tube opposite the end having the gas injector, a graphite rod was placed (to initiate arcing) and the coil was positioned. RF power was applied to the coil, and at about 8 kV plate voltage and 3 plate amps, a stable isothermal RF plasma was formed. The power was then increased to 10 kV and 4 plate amps, the graphite rod was removed, and the coil (and plasma) were traversed along the tube at 300 cm/min. while the tube was rotated at 30 rpm. Upon reaching the end of the tube, the coil and plasma were reversed, but at a lower traverse rate of 200 cm/min. After 15 such 300–200 cycles, the plasma power was shut off, and the tube was annealed by a single traverse of an oxy-hydrogen torch at 5 cm/min, to remove any residual stress. (Standards were run to determine if the anneal had an effect on roughness. No effect was found.)

After cooling, the roughness of the bore was remeasured by the same method as prior to the treatment. The results are shown as sample A'. Before the plasma treatment, the average RA was about 10; after the treatment, the average RA was about 1.5

EXAMPLE 2

Figure 2:
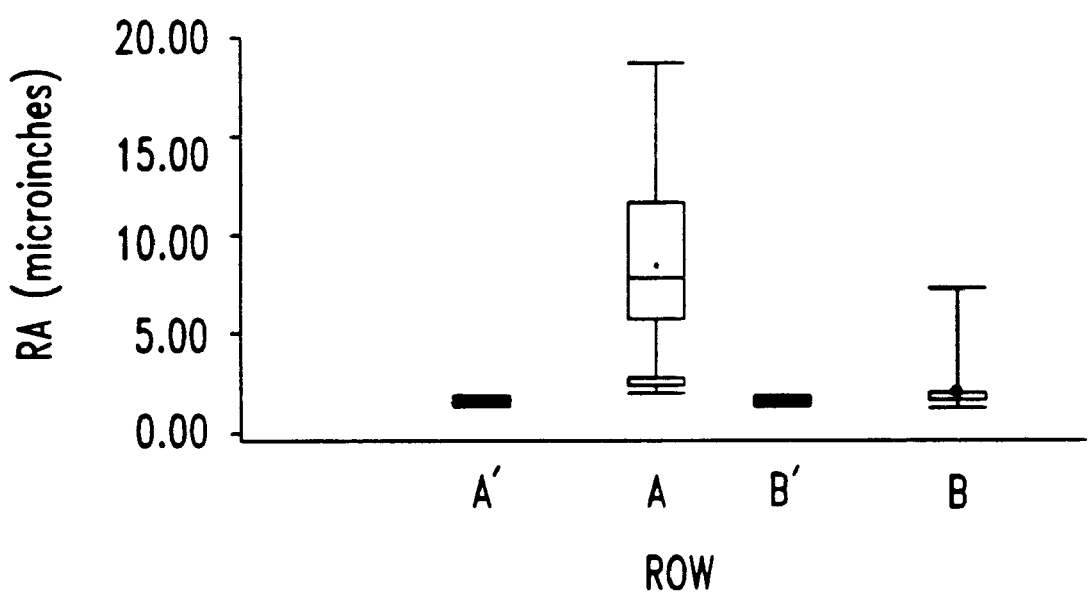
FIG. 2 shows the surface roughness values for silica bodies both before and after treatment by the process of the invention.

A silica overcladding tube of approximately the same dimensions as in Example 1, but formed by drawing from a silica billet, was obtained, and the RA measured as in Example 1. The results are shown in FIG. 2 as sample B. The tube was subjected to the same plasma treatment and anneal as in Example 1. The RA measurement after the treatment is shown in FIG. 2 as sample B'. Before the treatment, the RA was about 2.5; after the plasma treatment, the RA was about 1.5.

Other embodiments of the invention will be apparent to those skilled in the art from consideration of the specification and practice of the invention disclosed herein.

What is claimed is:

1. A method for fabricating an article comprising a refractory dielectric body, comprising the steps of:

provinding the refractory dielectric body, wherein the refractory dielectric body is sold; and treating a surface of the body with a plasma fireball such that the roughness of the surface is reduced, without substantial removal of the surface.

2. The method of claim 1, wherein the treatment reduces the roughness of the surface, as measured in RA, by at least a factor of 2.

3. The method of claim 1, wherein the RA subsequent to treatment is about 1 microinch or less.

4. The method of claim 3, wherein the RA subsequent to treatment is about 0.5 microinches or less.

5. The method of claim 2, wherein the body is a silica sol-gel body.

6. The method of claim 5, wherein the treatment reduces the roughness of the surface, as measured in RA, by at least a factor of 5.

7. The method of claim 1, wherein the body is treated with the plasma fireball in the absence of simultaneous deposition of material onto the body.

8. The method of claim 1, wherein less than 0.05 mm of the surface, over at least 90% of the body, is removed by the treatment step.

9. The method of claim 8, wherein no portion of the surface, over at least 90% of the body, is removed by the treatment step.

10. The method of claim 1, wherein the body comprises silica.

11. The method of claim 10, wherein the body is a core rod.

12. A method for fabricating an article comprising a refractory dielectric body, comprising the steps of:

providing the refractory dielectric body; and treating a surface of the body with a plasma fireball such that the roughness of the surface is reduced without substantial removal of the surface, wherein the plasma fireball is generated by an isothermal plasma torch.

13. The method of claim 12, wherein the plasma torch has a power of about 10 to about 100 kW.

14. The method of claim 12, wherein the plasma-generating gas comprises at least one gas selected from oxygen, argon, nitrogen, and helium.

15. A method for fabricating an article comprising a refractory dielectric body, comprising the steps of:

provuding the refractory dielectric body, wherein the body is hollow; and treating an inner surface of the hollow body with a plasma fireball such that the roughness of the inner surface is reduced, without substantial removal of the inner surface, wherein the plasma fireball is generated by an isothermal plasma torch.

16. The method of claim 15, wherein the body is a tube.

17. The method of claim 15, wherein the treatment reduces the roughness of the inner surface, as measured in RA, by at least a factor of 2.

18. The method of claim 15, wherein the RA subsequent to treatment is about 1 microinch or less.

19. The method of claim 18, wherein the RA subsequent to treatment is about 0.5 microinches or less.

20. The method of claim 15, wherein less than 0.05 mm of the inner surface, over at least 90% of the body, is removed by the treatment step.

21. The method of claim 20, wherein no portion of the inner surface, over at least 90% of the body, is removed by the treatment step.

22. A method for fabricating an article comprising a refractory dielectric body, comprising the steps of:

providing the refractory dielectric body, wherein the body is hollow; and treating an inner surface of the hollow body with a plasma fireball such that the roughness of the inner surface is reduced, without substantial removal of the inner surface, wherein the plasma fireball is generated by an isothermal plasma torch and wherein the hollow body constitutes a portion of the isothermal plasma torch.

23. The method of claim 22, wherein the hollow body is a tube.

24. The method of claim 22, wherein the treatment reduces the roughness of the inner surface, as measured in RA, by at least a factor of 2.

25. The method of claim 22, wherein the RA subsequent to treatment is about 1 microinch or less.

26. The method of claim 25, wherein the RA subsequent to treatment is about 0.5 microinches or less.

27. The method of claim 22, wherein less than 0.05 mm of the inner surface, over at least 90% of the body, is removed by the treatment step.

28. The method of claim 27, wherein no portion of the inner surface, over at least 90% of the body, is removed by the treatment step.

* * * * *